United States Patent
Barnes et al.

(10) Patent No.: US 7,104,702 B2
(45) Date of Patent: Sep. 12, 2006

(54) FIELD INSTALLABLE OPTICAL FIBER CONNECTOR

(75) Inventors: Brandon A. Barnes, Ft. Worth, TX (US); Scott E. Semmler, Keller, TX (US); Derek N. Johnson, N. Richland Hills, TX (US)

(73) Assignee: Corning Cable Systems LLC, Hickory, NC (US)

( * ) Notice: Subject to any disclaimer, the term of this patent is extended or adjusted under 35 U.S.C. 154(b) by 234 days.

(21) Appl. No.: 10/808,057

(22) Filed: Mar. 24, 2004

(65) Prior Publication Data

US 2005/0213890 A1    Sep. 29, 2005

(51) Int. Cl.
 *G02B 6/36* (2006.01)

(52) U.S. Cl. .............. 385/77; 385/78; 385/81; 385/95; 385/139

(58) Field of Classification Search ........... 385/70, 385/72, 73, 77, 78, 60, 62, 81, 139, 96, 97, 385/98, 99, 53, 95
See application file for complete search history.

(56) References Cited

U.S. PATENT DOCUMENTS

| | | | | |
|---|---|---|---|---|
| 4,422,716 A | | 12/1983 | Morimoto et al. | 350/96.21 |
| 4,695,124 A | | 9/1987 | Himono et al. | 350/96.2 |
| 4,755,018 A | | 7/1988 | Heng et al. | 350/96.21 |
| 5,040,867 A | | 8/1991 | deJong et al. | 385/60 |
| 5,101,463 A | * | 3/1992 | Cubukciyan et al. | 385/72 |
| 5,259,047 A | | 11/1993 | Morrison et al. | 385/27 |
| 5,748,819 A | | 5/1998 | Szentesi et al. | 385/60 |
| 5,915,058 A | * | 6/1999 | Clairardin et al. | 385/77 |
| 5,963,692 A | | 10/1999 | Marazzi et al. | 385/80 |
| 5,984,531 A | | 11/1999 | Lu | 385/60 |
| 6,068,410 A | | 5/2000 | Giebel et al. | 385/72 |
| 6,173,097 B1 | | 1/2001 | Throckmorton et al. | 385/59 |
| 6,234,685 B1 | | 5/2001 | Carlisle et al. | 385/83 |
| 6,318,903 B1 | | 11/2001 | Andrews et al. | 385/77 |
| 6,379,054 B1 | | 4/2002 | Throckmorton et al. | 385/66 |
| 6,439,780 B1 | | 8/2002 | Mudd et al. | 385/83 |
| 6,540,410 B1 | | 4/2003 | Childers et al. | 385/78 |
| 6,550,979 B1 | | 4/2003 | Fleenor et al. | 385/78 |
| 6,565,262 B1 | | 5/2003 | Childers et al. | 385/76 |
| 6,783,281 B1 | * | 8/2004 | Cheng | 385/55 |
| 2001/0002220 A1 | | 5/2001 | Throckmorton et al. | |
| 2003/0215171 A1 | | 11/2003 | Lampert et al. | 385/11 |
| 2003/0215190 A1 | | 11/2003 | Lampert et al. | |
| 2005/0036744 A1 | | 2/2005 | Caveney et al. | |

FOREIGN PATENT DOCUMENTS

| | | | | |
|---|---|---|---|---|
| EP | 0638828 A1 | | 8/1994 | |
| EP | 1136860 A2 | | 9/2001 | |
| JP | 09-197157 | * | 7/1997 | 385/96 |

* cited by examiner

*Primary Examiner*—Brian M. Healy
(74) *Attorney, Agent, or Firm*—Jeffrey S. Bernard

(57) ABSTRACT

A field installable fiber optic connector includes a housing, a spring element seat and a ferrule holder that is inserted from the rearward end of the housing. A spring element inserted into the front of the housing abuts the spring element seat. A spring element retainer attached to the ferrule holder abuts the forward portion of the spring element to compress the spring element and bias the ferrule holder forward. An optical fiber stub disposed between opposed splice members in an aligning groove terminates intermediate the ends of the splice members. An optical fiber is inserted between the splice members and guided by the groove into abutment with the end of the optical fiber stub. A cam disposed about the ferrule holder is movable to facilitate insertion of the optical fiber and to clamp the optical fiber and the optical fiber stub between the splice members.

28 Claims, 11 Drawing Sheets

FIELD INSTALLABLE OPTICAL FIBER CONNECTOR

BACKGROUND OF THE INVENTION

1. Field of the Invention

The present invention relates generally to optical fiber connectors and more particularly to optical fiber connectors adapted for field installation.

2. Technical Background

Optical fibers are widely used in a variety of applications, including the telecommunications industry in which optical fibers are employed in a number of telephony and data transmission applications. Due, at least in part, to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals or pedestals, is required. However, in order to efficiently couple the signals transmitted by the respective optical fibers, an optical fiber connector must not significantly attenuate or alter the transmitted signals. In addition, the optical fiber connector must be relatively rugged and adapted to be connected and disconnected a number of times in order to accommodate changes in the optical fiber transmission path.

In order to provide the desired signal transmission characteristics, a number of optical fiber connectors have been developed which are mounted to the end portion of an optical fiber during a factory assembly process. By mounting the optical fiber connector to the optical fiber and/or optical fiber cable (hereinafter optical fiber) during an assembly process at the factory, the assembly of the optical fiber connector can be standardized such that inconsistent assembly and other problems associated with the field installation of the connector are avoided.

However, the factory installation of fiber optic connectors is not altogether satisfactory for every application. In particular, the factory installation of fiber optic connectors does not customize the installation process to account for the myriad of design variations experienced in the field. For example, by installing fiber optic connectors to the end portion of an optical fiber at the factory, the length of the connectorized optical fiber is fixed, thus requiring excess length and coiling to insure sufficient length for all applications. In addition, in many instances it is desirable to cut a length of optical fiber into a plurality of shorter lengths of optical fiber, each of which must be individually connected, such as by an optical fiber connector, to another optical fiber or to a patch panel or other type of terminal. However, the respective lengths of the shorter optical fibers cannot generally be determined until the optical fibers are installed in the field. Thus, in this instance, the requisite optical fiber connectors cannot be mounted to the fibers at the factory prior to installation of the optical fiber. Still further, it is desirable in many instances to package and ship optical fiber prior to the installation of the fiber optic connectors since the fiber optic connectors generally have a greater diameter than the respective optical fiber, and may unnecessarily complicate the packaging and shipping of the optical fiber.

Consequently, several optical fiber connectors have been developed which can be mounted to the end portion of an optical fiber in the field once the particular application of the optical fiber has been determined. For example, U.S. Pat. No. 5,040,867 which issued Aug. 20, 1991 to Michael de Jong et al. and which is assigned to the assignee of the present invention, discloses an optical fiber connector which is adapted for installation in the field. One commercial embodiment of the optical fiber connector of U.S. Pat. No. 5,040,867 is the Camlite® connector which is manufactured and distributed by Corning Cable Systems LLC of Hickory, N.C.

The Camlite® connector includes a lengthwise extending ferrule defining a longitudinal bore therethrough attached to a V-groove splice with a cam member for securing a fiber in the splice. A short length of optical fiber, typically termed an optical fiber stub, is disposed in the bore of the ferrule and extends into the V-groove splice. In the field, the end portion of an optical fiber, typically termed the field fiber, to which the optical fiber connector is to be connected, can be inserted in the V-groove splice from the end opposite the ferrule. Due to the precise alignment of the longitudinally extending V-groove within the Camlite® connector, the end portion of the field fiber is aligned with the optical fiber stub and thereafter held in place by activating the cam member.

The Camlite® connector can also include a crimp tube mounted to the end of the V-groove opposite the ferrule such that the field fiber extends therethrough. By compressing the crimp tube radially inward so as to contact the field fiber cable, the field fiber is fixed in position relative to the ferrule and the aligned optical fiber stub. The ferrule of the Camlite® connector can, in turn, be disposed within any of the standard connector housings. For example, the ferrule of the Camlite® connector is compatible with and can be mounted within an FC, ST or SC connector housing. The resulting Camlite® connector can then be connected, such as with an adapter or coupling sleeve, to the end portion of another optical fiber which also has an appropriate connector mounted to an end portion thereof. Alternatively, the resulting Camlite® connector can be connected to a patch panel, remote terminal or pedestal.

While the Camlite® connector is a great advance in the art, the Camlite® connector employs a cam member utilizing axial movement to establish a splice between the field fiber and the stub fiber. This may result in compressing together the abutting end faces of the optical fibers and potentially damaging the end faces. Moreover, The Camlite® connector, as with other field installable connectors, does not include a feature for readily and visually determining that an acceptable splice has been made.

SUMMARY OF THE INVENTION

A broad aspect of the invention includes a housing having an inner surface defining a cavity extending longitudinally therethrough and a spring element seat disposed therein, the housing also defining a forward opening in communication with the cavity and a rearward opening in communication with the cavity. The connector also comprises a spring element inserted into the cavity through the forward opening of the housing and a ferrule holder inserted into the cavity through the rearward opening of the housing. A spring element retainer is disposed about a forward end of the ferrule holder, and the spring element is disposed between the spring element seat and the spring element retainer thereby urging the ferrule holder forward with a predetermined spring force. Preferably, the predetermined spring force is greater than about 1 lb; more preferably between about 1 and 1.5 lbs; and most preferably between about 1.1 and 1.4 lbs. The optical fiber connector comprises a ferrule disposed within the ferrule holder, and an optical fiber stub disposed within the ferrule. The optical fiber connector according to an embodiment of the invention also comprises a view port for providing a visual indication of the quality of a splice between the optical fiber stub and a second optical fiber within the connector.

In another broad aspect of the invention an optical fiber connector is provided which includes a housing having an inner surface defining a cavity extending longitudinally and a spring element seat therein, the housing also defining a rearward opening in communication with the cavity and a forward opening in communication with the cavity. The optical fiber connector according to an embodiment of the invention further comprises a ferrule having first and second ends with a passageway disposed axially therebetween, and an optical fiber stub disposed within the ferrule passageway. A ferrule holder extends longitudinally between opposing first and second ends and defines a passageway extending longitudinally therebetween. The ferrule holder first end is inserted through the housing rearward opening and extends beyond the spring element seat. The ferrule holder is configured to hold the ferrule and is slidable longitudinally within the housing. A spring element retainer is disposed at the first end of the ferrule holder. A first and second opposed splice member are disposed within the ferrule holder, each splice member extending longitudinally from a first end proximate the second end of the ferrule to an opposite second end. One of the splice members includes a longitudinal fiber aligning groove wherein the optical fiber stub extends between the opposed splice members in the groove and terminates at a position intermediate the first and second ends of the splice members. A cam member having a first end, a second end and a passageway extending longitudinally therebetween is disposed about the ferrule holder. A spring element is disposed between the spring element seat and the spring element retainer, the spring element urging the ferrule holder forward with a predetermined spring force. The ferrule holder preferably comprises a stop disposed at an intermediate position between the ferrule holder first and second ends and configured to cooperate with the housing rearward opening. Preferably, the predetermined spring force is greater than about 1 lb; more preferably between about 1 lb. and 1.5 lbs; and most preferably between about 1.1 and 1.4 lbs. The optical fiber connector preferably comprises a port for providing a visual indication of the quality of a splice between the optical fiber stub and a field fiber.

In still another aspect of the invention, an optical fiber connector having a view port for providing a visual indication of the quality of a splice between a first and second optical fiber within the connector is disclosed.

In yet another broad aspect of the invention, a method of determining the quality of a splice between first and second optical fibers within an optical fiber connector is proposed, the method comprising passing a visible light through at least one of the optical fibers and viewing a view port on the connector for visual indication of the quality of a splice between the first and second optical fibers. Preferably, the visible light is a laser light or light from a light emitting diode (LED). The visual indication preferably comprises either the absence of visible light or the presence of light within the view port.

Although the optical fiber connector disclosed herein is generally described as an LC connector, it should be understood that the choice of an LC connector is for illustrative purposes only, and that the principals as described herein may be applied to other optical fiber connectors as well, such as SC, ST and FC connectors.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE EMBODIMENTS

Figure 1:
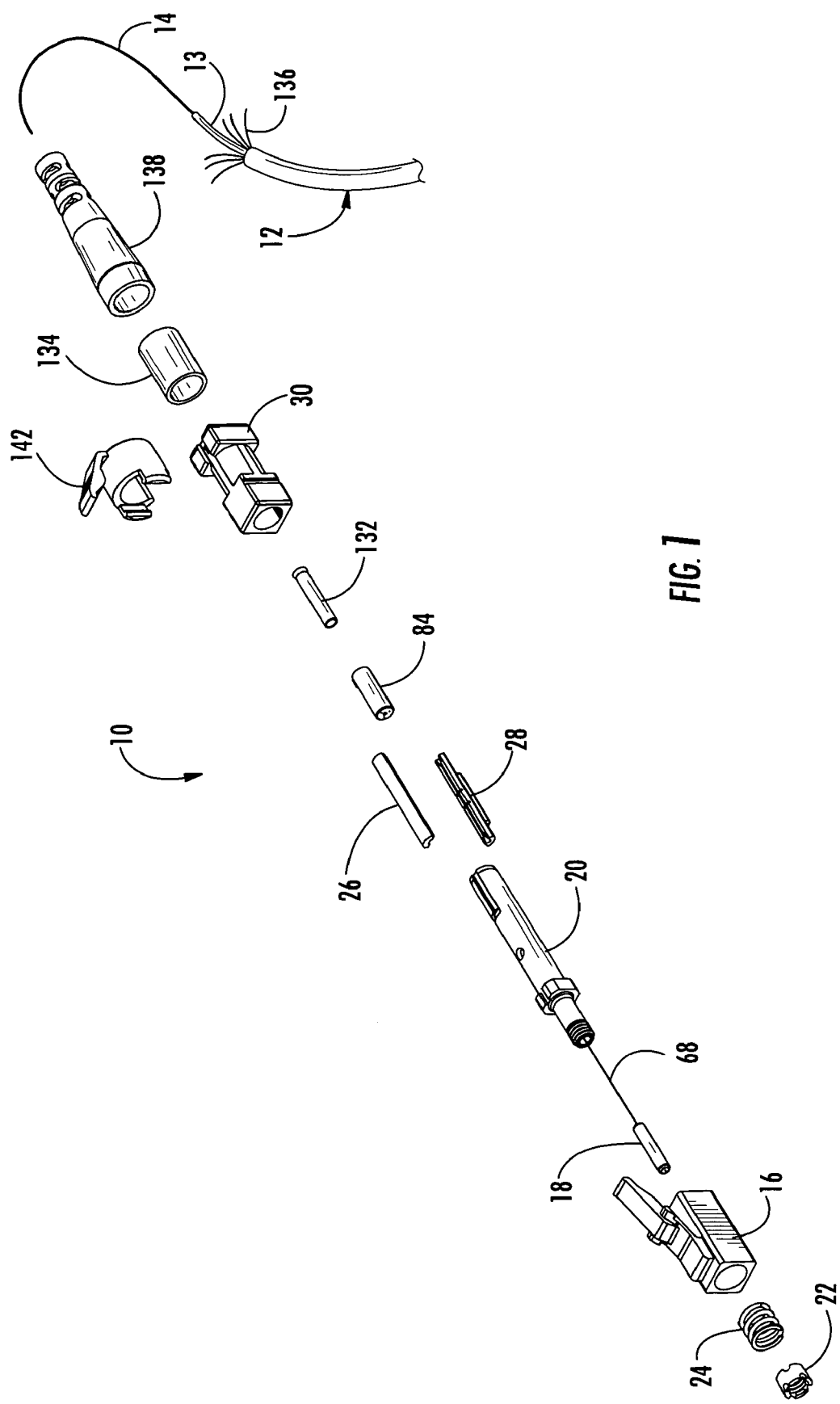
FIG. 1 is an exploded view of a fiber optic connector according to an embodiment of the present invention.

Detailed references will now be made to the drawings in which examples embodying this invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and not meant as a limitation of the invention. This invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

As embodied in FIG. 1, a fiber optic connector 10 for connecting an optical fiber cable 12 to a receptacle (not shown), such as another connector, a connector adapter or other optical device, is provided.

With more particular reference to the Figures, connector 10 is attached to field fiber 14 of optical fiber cable 12. Field fiber 14 typically has a glass diameter of about 125 μm. Typically, field fiber 14 also comprises one or more coatings disposed about the optical fiber. The one or more coatings may have various diameters, including diameters from about 245 μm to 900 μm for a buffered optical fiber, without departing from the scope of the present invention. Connector 10 includes connector housing 16, ferrule 18, ferrule holder 20, spring element retainer 22, spring element 24, splice members 26, 28, and cam member 30.

Figure 2:
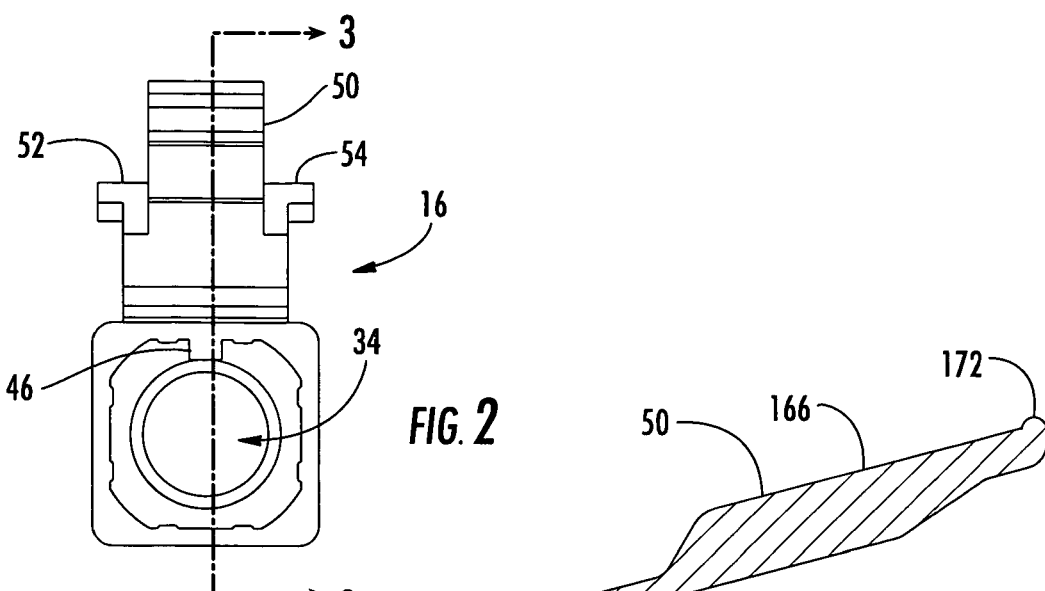
FIG. 2 is an end view of the rearward end of the connector housing of FIG. 1 showing the alignment key.
Figure 3:
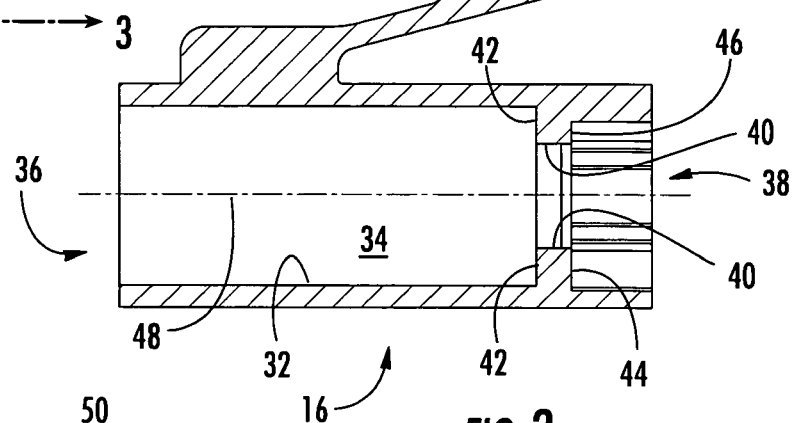
FIG. 3 is a longitudinal cross section of the connector housing of FIG. 1 taken along the line 3—3 in FIG. 2.

As shown in greater detail in FIGS. 2 and 3, connector housing 16 has an inner surface 32 defining cavity 34 which extends longitudinally within housing 16. Housing 16 further includes a forward opening 36 in communication with cavity 34 and a rearward opening 38 also in communication with cavity 34. Rearward opening 38 is configured to receive ferrule holder 20 (FIG. 1). Inner surface 32 of cavity 34 further defines a spring element seat 40, the forward face 42 thereof providing a surface against which spring element 24 (FIG. 1) may abut. Spring element seat 40 is generally located proximate to rearward opening 38. The rearward face 44 of spring element seat 40 serves as a positive stop to limit the forward movement of ferrule holder 20 into housing cavity 34. Inner surface 32 includes key 46 extending into cavity 34 at rearward opening 38. Key 46 may be more clearly seen in FIG. 2 showing a view of housing 16 looking forward toward forward opening 36 from rearward opening 38. Preferably key 46 extends between the rearward face 44 of spring element seat 40 and opening 38. Preferably, that portion of cavity 34 which extends forward of spring element seat 40 to forward opening 36 has a circular cross section in a plane orthogonal to longitudinal axis 48, as best shown in FIG. 2. Preferably, that portion of cavity 34 which extends rearward of spring element seat 40 to rearward opening 38 has a cross sectional shape in a plane orthogonal to longitudinal axis 48 which is adapted to receive the cross sectional shape of at least a portion of ferrule holder 20. Preferably, that portion of cavity 34 which extends rearward of spring element seat 40 to rearward opening 38 has a polygonal cross section in a plane orthogonal with longitudinal axis 48 of housing 16.

Figure 4:
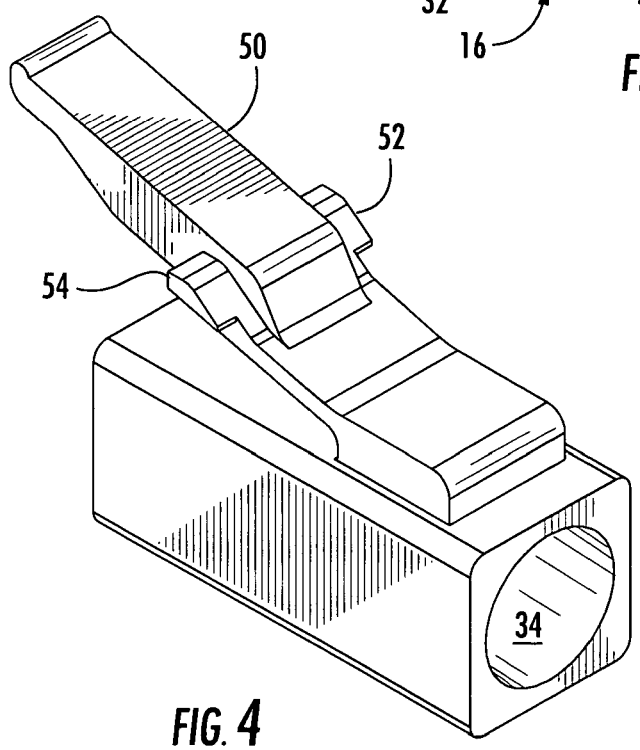
FIG. 4 is a perspective view of the connector housing of FIG. 1 showing the latching arm and latching lugs.

Housing 16 also includes latching arm 50 and, as more clearly seen in FIG. 4, opposing latching lugs 52, 54 extending from housing 16 for latching connector 10 in place, such as, for example, an adapter adapted to receive connector 10. Preferably, latching arm 50 is of a sufficient resiliency to allow latching arm 50 to be depressed and to return to its un-depressed position when latching arm 50 is released. Preferably, housing 16, latching arm 50, latching lugs 52, 54, spring element seat 40 and key 46 are comprised of a suitable plastic material and are molded in one piece therefrom.

Figure 5:
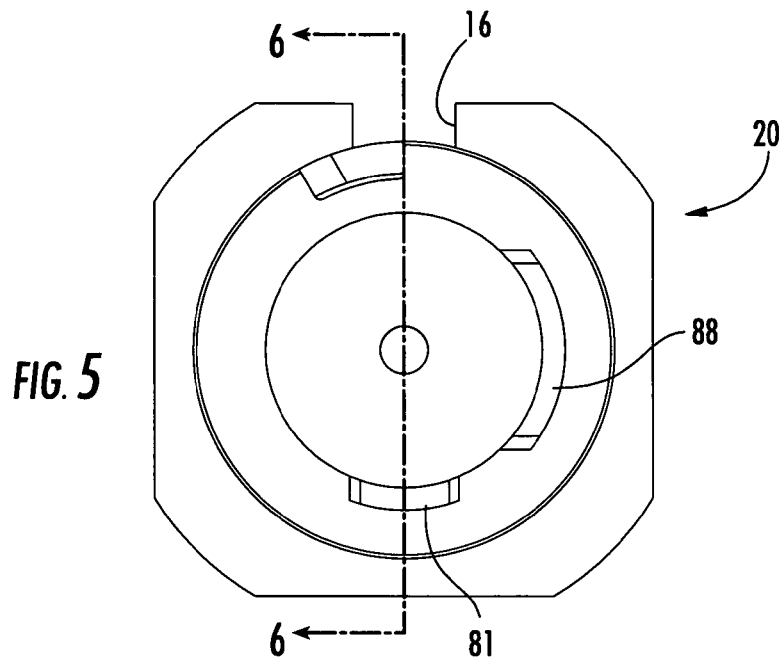
FIG. 5 is an end view of the rearward end of the ferrule holder of FIG. 1.
Figure 6:
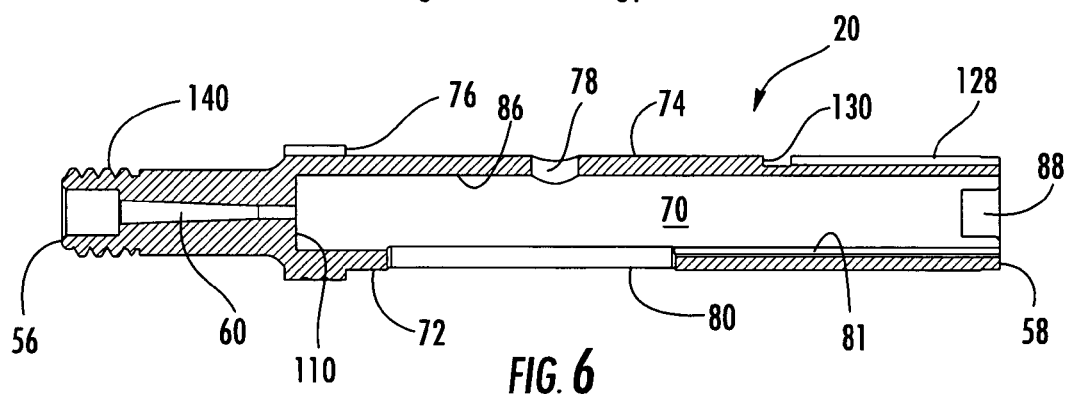
FIG. 6 is a longitudinal cross section of the ferrule holder of FIG. 1 taken along the line 6—6 in FIG. 5.
Figure 7:
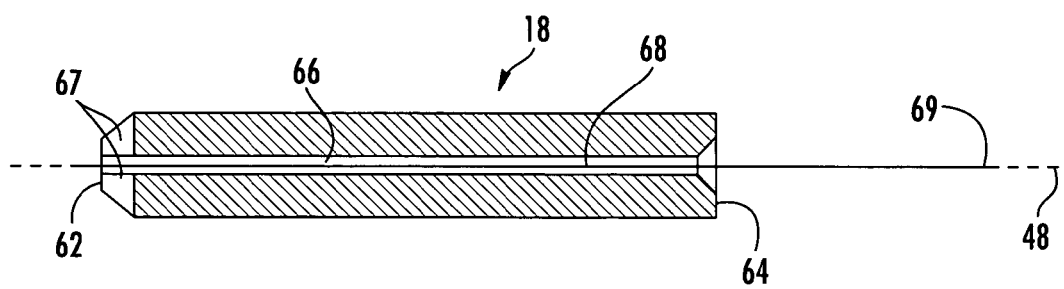
FIG. 7 is a longitudinal cross section of the ferrule and the optical fiber stub of FIG. 1.

As illustrated in FIGS. 5 and 6, ferrule holder 20 extends longitudinally between first end 56 and second end 58, and defines a longitudinally extending passageway 60. Passageway 60 proximate first end 56 of ferrule holder 20 is sized to receive ferrule 18, which may be made of any suitable, wear-resistant material such as ceramic, glass, metal, glass-reinforced epoxy or a polymer plastic. Ferrule 18, shown in FIG. 7, has a first end 62 and a second end 64 and defines bore 66 extending axially therethrough. Optical fiber stub 68 is disposed in bore 66 such that second end 69 of optical fiber stub 68 extends beyond second end 64 of ferrule 18. Preferably, second end 69 of optical fiber stub 18 extends at least about 5 mm beyond second end 64 of ferrule 18; more preferably at least about 10 mm. Optical fiber stub 68 is preferably secured in bore 66 with an adhesive such as an epoxy adhesive. The second end 69 of optical fiber stub 68 is preferably cleaved with a good finish, the cleave angle being preferably less than about one degree. The first end 69 of optical fiber stub 68 is preferably polished to facilitate optical transmission therethrough.

Returning to FIG. 6, ferrule holder 20 further defines cavity 70 in communication with passageway 60 to accommodate splice members 26 and 28 (FIG. 1). Ferrule holder 20 includes a shoulder 72, or stop, on outside surface 74 of ferrule holder 20 which is configured to be received into rearward opening 38 of connector housing 16. A groove 76 extending longitudinally along at least a portion of stop 72 (more clearly seen in FIG. 8) is configured to slidably engage with key 46 to provide for the correct orientation of ferrule holder 20 within housing 16. Preferably, ferrule holder 20 also defines view port 78 extending from outside surface 72 into cavity 70 proximate the location of the mechanical abutment between stub fiber 68 and field fiber 14. During operation of connector 10, field fiber 14 and stub fiber 68 are abutted proximate view port 78 and a visible light, such as that from a HeNe laser or an LED, for example, is guided through at least one of the field fiber 14 or stub fiber 68. If an incorrect abutment is obtained, light guided by optical fiber stub 68 or field fiber 14 will be scattered at the opposing end face and will be visible through view port 78. When an acceptable abutment, or splice, is obtained, the light will be substantially guided between optical fiber stub 68 and field fiber 14, with little scattering at the abutment thereof, and light from the laser or LED will no longer be visible through view port 78. Therefore, view port 78 provides a visual indication of an acceptable mechanical splice (abutment) between the optical fiber stub 68 and the field fiber 14. If the splice is unacceptable, the laser or LED light will not be visible through view port 78. View port 78 may also be used as an access point for injecting an optical coupling material or refractive index matching gel into cavity 70 to improve the optical coupling between the optical fiber stub 48 and field fiber 14.

Figure 11:
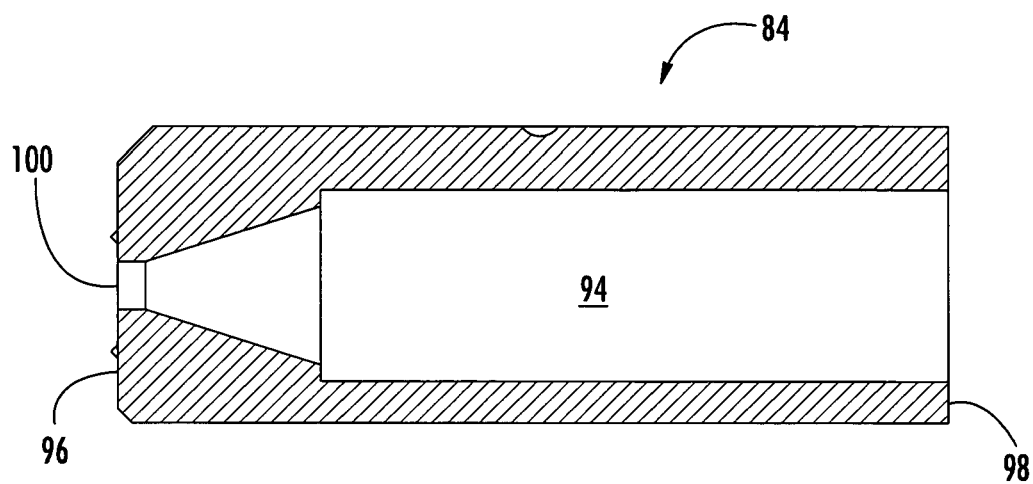
FIG. 11 is a longitudinal cross section of the lead in tube of FIG. 1 taken along the line 11—11 in FIG. 9.
Figure 12:
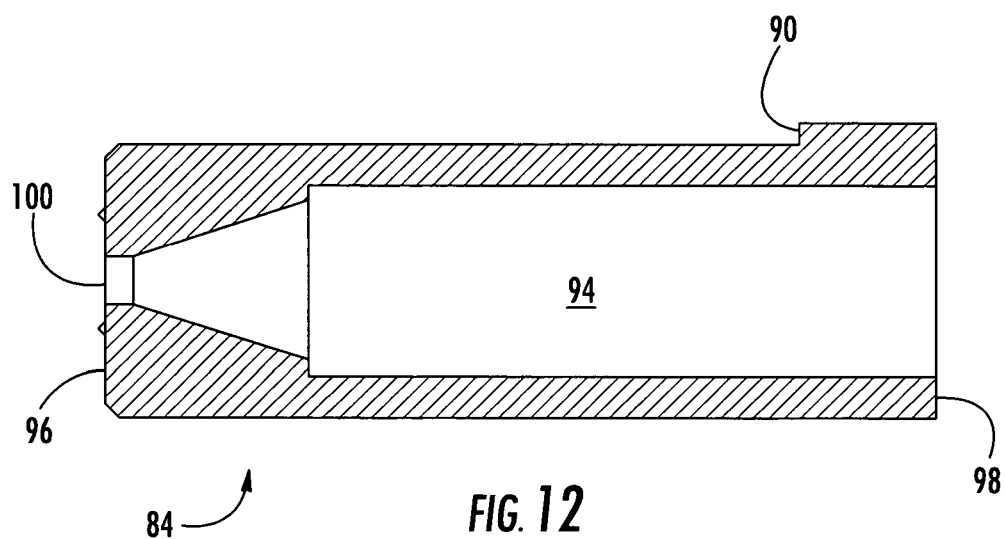
FIG. 12 is a longitudinal cross section of the lead in tube of FIG. 1 taken along the line 12—12 in FIG. 9.

Ferrule holder 20 also includes a slot, or window 80 extending between outside surface 74 and cavity 70 to accommodate a portion of lower splice component 28. Window 80 is generally located opposite view port 78. Second end 58 of ferrule holder 20 is adapted to receive a lead in tube 84, illustrated in FIGS. 9–12, for guiding field fiber 14 into cavity 70 between splice members 26, 28. Preferably, inside surface 86 of cavity 70 defines an axial groove 88 for receiving key 90 located on outside surface 92 of lead in tube 84. When lead in tube 84 is inserted into second end 58 of ferrule holder 20, groove 88 slidably engages with key 90 to prevent rotation of lead in tube 84 within ferrule holder 20. Lead in tube 84 defines a passageway 94 (FIGS. 11 and 12) extending axially between a first end 96 and a second end 98 of lead in tube 84 for accommodating field fiber 14. Lead in tube 84 may be secured within ferrule holder 20 with an adhesive, such as, for example, an epoxy adhesive. Alternatively, lead in tube 84 could be press fit within ferrule holder 20, or lead in tube 84 may be secured within ferrule holder 20 by cooperative retaining elements similar to those shown in FIGS. 21–23 and described infra. Preferably, second end 98 of passageway 94 is sized to accommodate a crimp tube 132 FIG. 1). Preferably, a portion of passageway 94 proximate first end 96 has a generally conical shape for guiding field fiber 14 through opening 100 at first end 96 of lead in tube 84.

Figure 13:
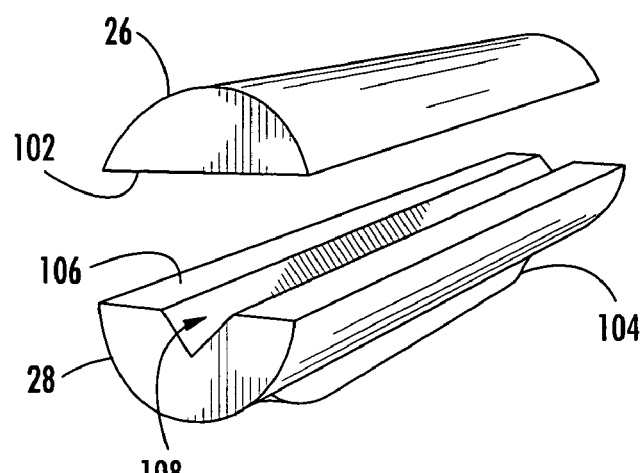
FIG. 13 is a perspective view of the first and second splice members of FIG. 1 showing the groove for aligning the optical fiber stub and the field fiber.

Splice members 26 and 28 are inserted into cavity 70 of ferrule holder 20 through second end 58 proximate view port 78 and window 80. First splice member 26 is generally adjacent view port 78, while second splice member 28 is generally adjacent window 80. As best depicted by FIG. 13, first splice member 26 is configured with a flat face 102 opposing second splice member 28. Second splice member 28 comprises a projection, or keel portion 104 which protrudes through window 80 when splice member 28 is inserted into cavity 70 of ferrule holder 20. A channel 81 extending from second end 58 of ferrule holder 20 to window 80 and shown in FIGS. 5 and 6 guides keel portion 104 to window 80, thereby facilitating the insertion of second splice member 28 into cavity 70 through second end 58, and the further insertion of keel 104 through window 80. On side 106 opposite keel portion 104 and opposing first splice component 26, second splice member 28 includes a groove 108 extending longitudinally along the length of second splice member 28. Although groove 108 as shown in FIG. 13 is generally V-shaped, groove 108 could be any other shape that supports optical fiber stub 68, such as, for example, a U-shaped groove. Alternatively, groove 108 could be formed in the opposing face of first splice component 26 and a flat face could be formed on the opposing face of second splice component 28. Splice members 26, 28 are prevented from moving forward within cavity 70 in ferrule holder 20 by shoulder 110 adjacent the point where cavity 70 is in communication with passageway 60. When ferrule 18 containing optical fiber stub 68 is positioned within first end 56 of ferrule holder 20, the end of optical fiber stub 68 projecting from ferrule 18 is received by groove 108 and lies between first and second splice members 26 and 28 at a generally intermediate position. When lead in tube 84 is inserted in second end 58 of ferrule holder 20, splice members 26, 28 are prevented from moving rearward within cavity 70 by the presence of lead in tube 84. Thus, splice members 26 and 28 are generally prevented from axial movement within cavity 70 by shoulder 110 and lead in tube 84.

Figure 9:
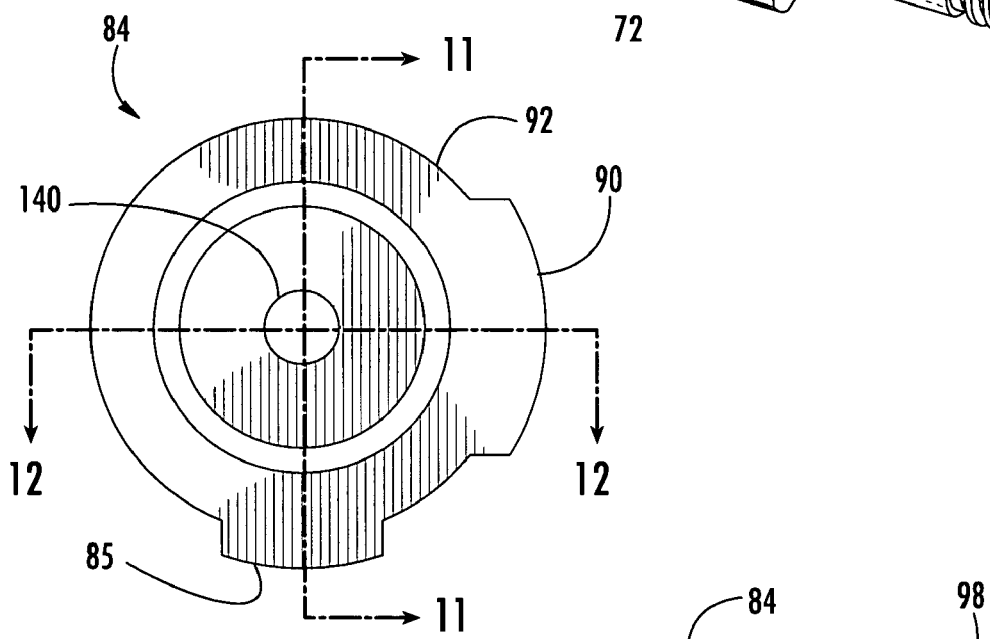
FIG. 9 is an end view of the lead in tube of FIG. 1.
Figure 10:
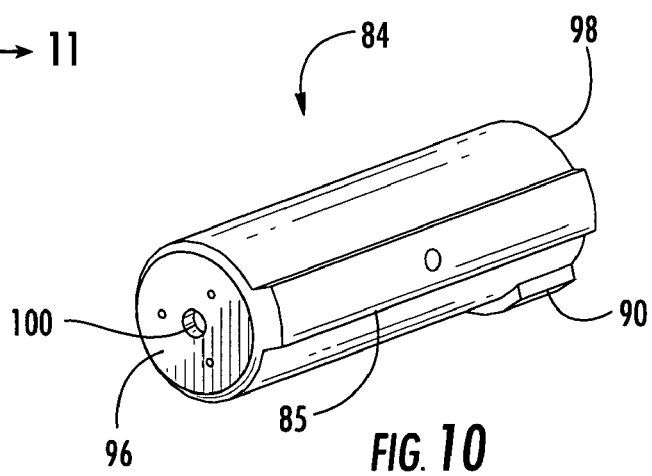
FIG. 10 is a perspective view of the lead in tube of FIG. 1.
Figure 15:
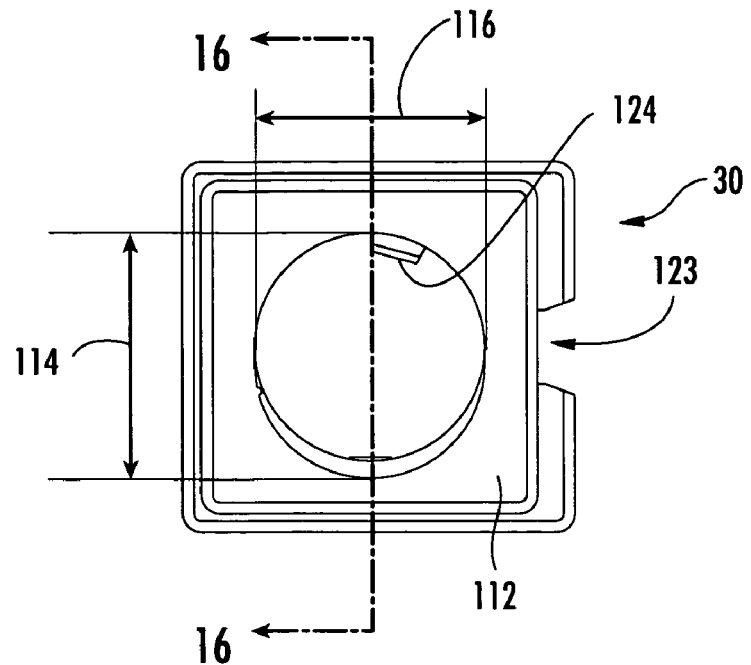
FIG. 15 is an end view of the cam member of FIG. 1 showing the major axis and the minor axis.
Figure 16:
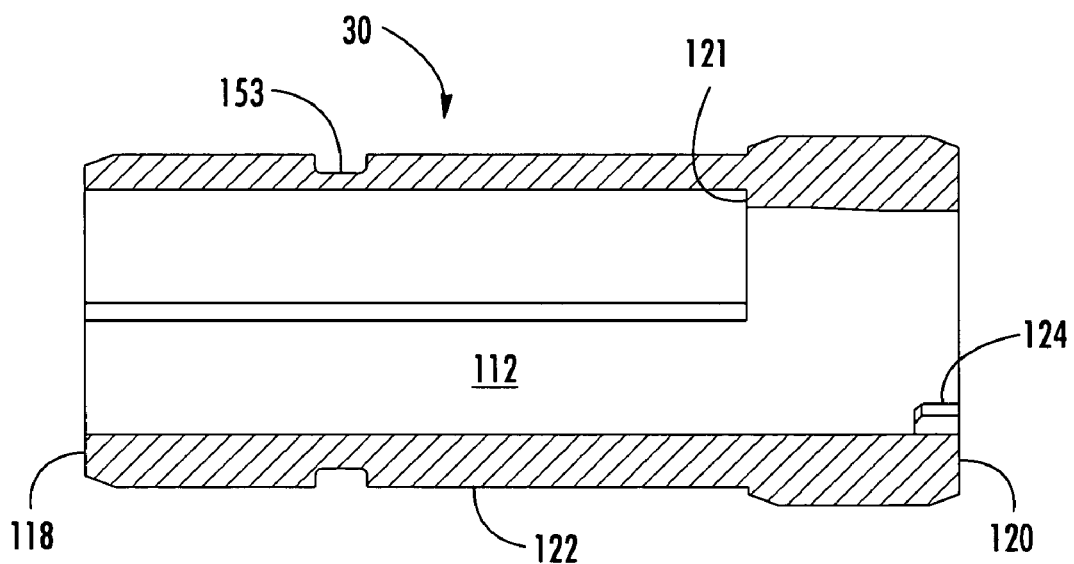
FIG. 16 is a longitudinal cross section of the cam member of FIG. 1 taken along the line 16—16 in FIG. 15.
Figure 17:
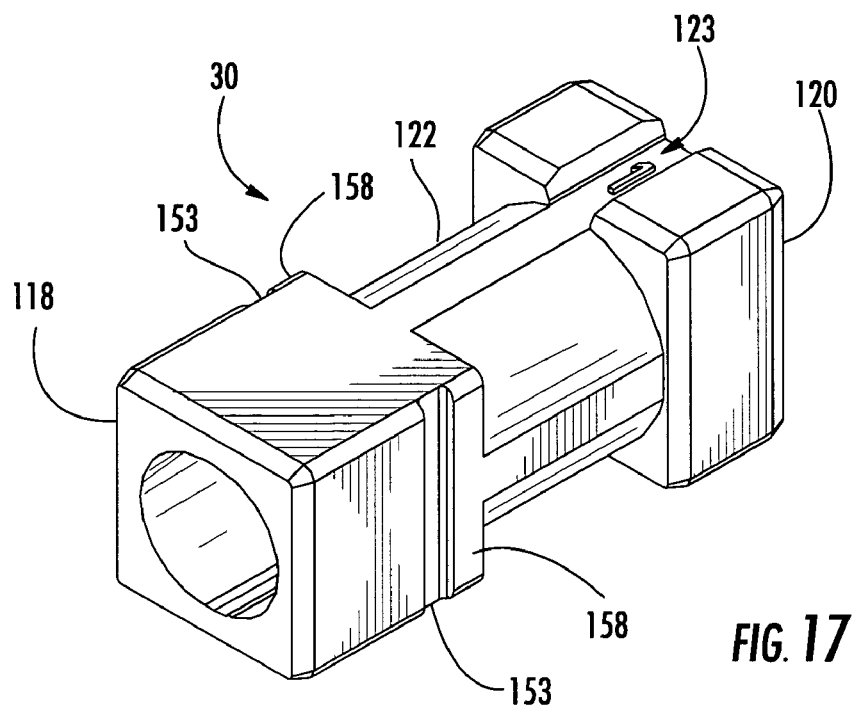
FIG. 17 is a perspective view of the cam member of FIG. 1.

Cam member 30 is mounted about ferrule holder 20 in an initial position generally proximate splice members 26, 28 as shown in FIG. 9. As illustrated in FIGS. 15–17, cam member 30 defines passageway 112 extending longitudinally between first end 118 and second end 120 that is sized to receive and therefore be mounted upon ferrule holder 20. In order to actuate splice members 26, 28, a portion of passageway 112 defined by cam member 30 is preferably noncircular and comprises a major axis 114 and a minor axis 116 as illustrated in FIG. 15. As best shown in FIG. 16, the portion of cam member 30 extending forward of shoulder 121 to end 118 is noncircular and defines major axis 114 and minor axis 116. That portion of cam member 30 extending rearward of shoulder 121 to end 120 is generally circular and facilitates engagement of cam member 30 with ferrule holder 20. Thus, shoulder 121 denotes the transition from the circular portion of passageway 112 and the noncircular portion of passageway 112. As shown by FIG. 16 and as evidenced by the thinner sidewall immediately adjacent the major axis 114 of cam member 30 at end 118, the portions of passageway 112 adjacent major axis 114 have a smaller radius than the radius of those portions of passageway 112 immediately adjacent minor axis 116. Moreover, passageway 112 is defined by cam member 30 such that the smaller radius of passageway 112 immediately adjacent major axis 114 transitions smoothly into the larger radius of passageway 112 immediately adjacent minor axis 116. Preferably, cam member 30 also includes an outside surface at end 120 adapted to cooperate with a tool (not shown) for rotating cam member 30 about ferrule holder 20. In the advantageous embodiment depicted in FIGS. 15–17, cam member 30 preferably comprises a first and second end 118, 120 separated by a barrel 122. The outside surface of cam member 30 at second end 120 may be formed as a polygon such that the outside surface of end 120 may cooperatively engage with a tool, such as a wrench, for example, for rotating cam member 30 about ferrule holder 20. However, it should be understood that the outside surface of end 120 may take on other shapes, such as a notched circular shape, which may cooperate with a complementary engaging surface or surfaces of an actuating tool. First end 118 is preferably formed to a shape and size which corresponds to the shape and size of the rearward portion of housing 16. Cam member 30 preferably includes an indicator element, such as groove 123 best shown in FIG. 17 at end 120, to indicate the rotational position of cam member 30, and thus the condition of splice members 26, 28 (i.e. actuated or un-actuated). For example, if visual indicator 123 is aligned with latch 50, splice members 26, 28 are actuated.

Figure 19:
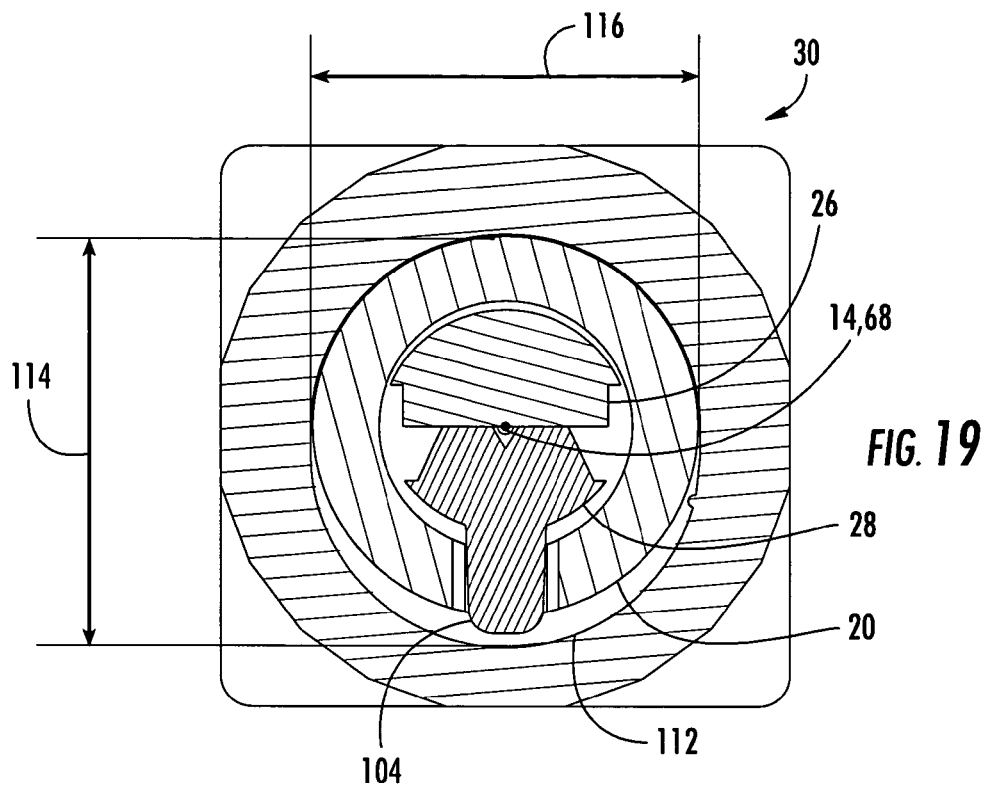
FIG. 19 is an end view of the splice members positioned within the ferrule holder with the cam member positioned on the ferrule holder and the keel portion of the second splice member aligned along the major axis of the cam member.
Figure 20:
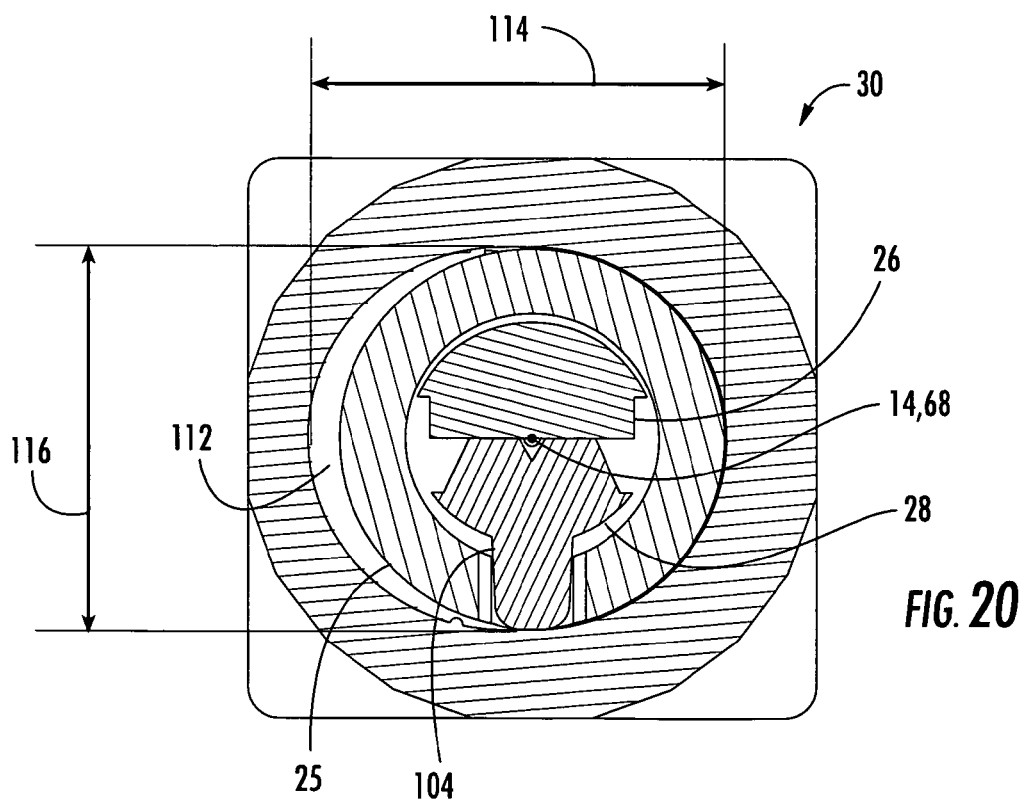
FIG. 20 is an end view of the splice members positioned within the ferrule holder with the cam member positioned on the ferrule holder and the keel portion of the second splice member aligned along the minor axis of the cam member.

As first illustrated in FIG. 19, cam member 30 of this advantageous embodiment is mounted upon ferrule holder 20 such that the noncircular portion of passageway 112 is generally disposed within ferrule holder 20 and exposed keel portion 104 of second splice member 28 is aligned with major axis 114 of passageway 112. As a result, cam member 30 can be readily mounted on ferrule holder 20 while splice members 26 and 28 remain un-actuated. As next shown in FIG. 20, once cam member 30 has been mounted upon ferrule holder 20, however, cam member 30 can be rotated relative to ferrule holder 20 from the first un-actuated position to a second actuated position so as to move the exposed keel portion 104 of second splice member 28 from a position along major axis 114 of passageway 112 to a position along minor axis 116 of passageway 112. Due to the smaller dimensions of passageway 112 along minor axis 116, cam member 30 operably contacts exposed keel portion 104 of second splice member 28 following rotation of cam member 30 relative to ferrule holder 20. As a result of this contact, cam member 30 actuates splice members 26, 28, such as by urging the splice members 26, 28 toward one another, so as to mechanically splice optical fiber stub 68 and field fiber 14 therebetween.

Figure 8:
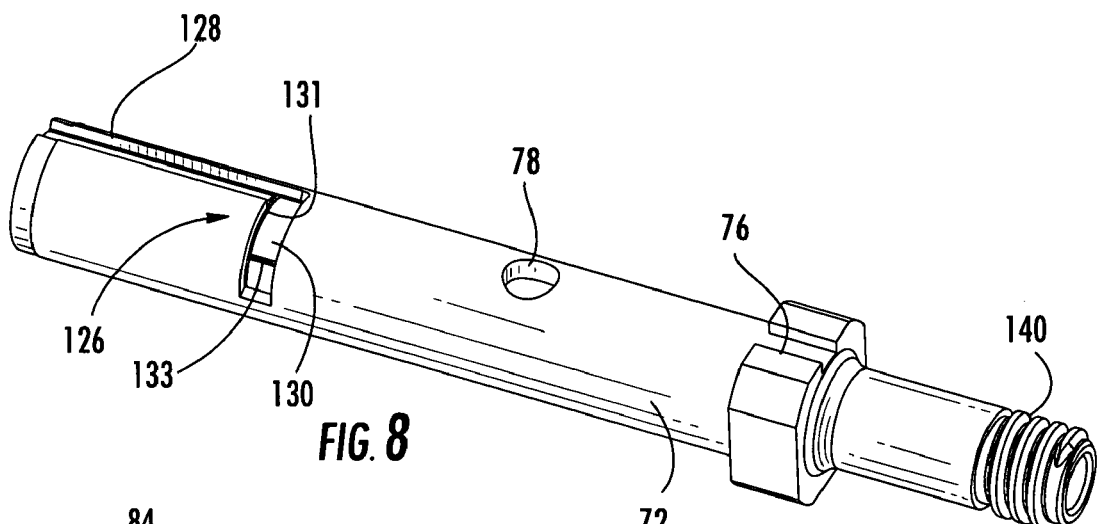
FIG. 8 is a perspective view of the ferrule holder of FIG. 1 showing the view port for providing a visual indication of the quality of a splice between the optical fiber stub and the field fiber, and showing the L-shaped groove for guiding the cam member.

As best shown in FIGS. 15 and 16, cam member 30 of one advantageous embodiment of the present invention includes an inwardly extending projection 124. While the inwardly extending projection 124 is adjacent one end of cam member 30 in the illustrated embodiment, the inwardly extending projection 124 can be positioned at other points along the lengthwise extending passageway 112, if so desired. As shown in FIG. 8, the outer surface 72 of ferrule holder 20 of this advantageous embodiment also preferably defines a groove 126 for receiving the inwardly extending projection 124. By confining the inwardly extending projection 124 within groove 126, ferrule holder 20 can guide cam member 30 as cam member 30 is initially mounted upon ferrule holder 20, i.e. slid lengthwise relative to ferrule holder 20, as cam member 30 is subsequently rotated relative to ferrule holder 20 from the first, un-actuated position to the second, actuated position. Preferably, cam member 30 is formed from a transparent or translucent material such that light which may emit from view port 78 when testing connector 10 for proper abutment (splice quality) of stub fiber 68 and field fiber 14 will be visible through cam member 30.

Figure 18:
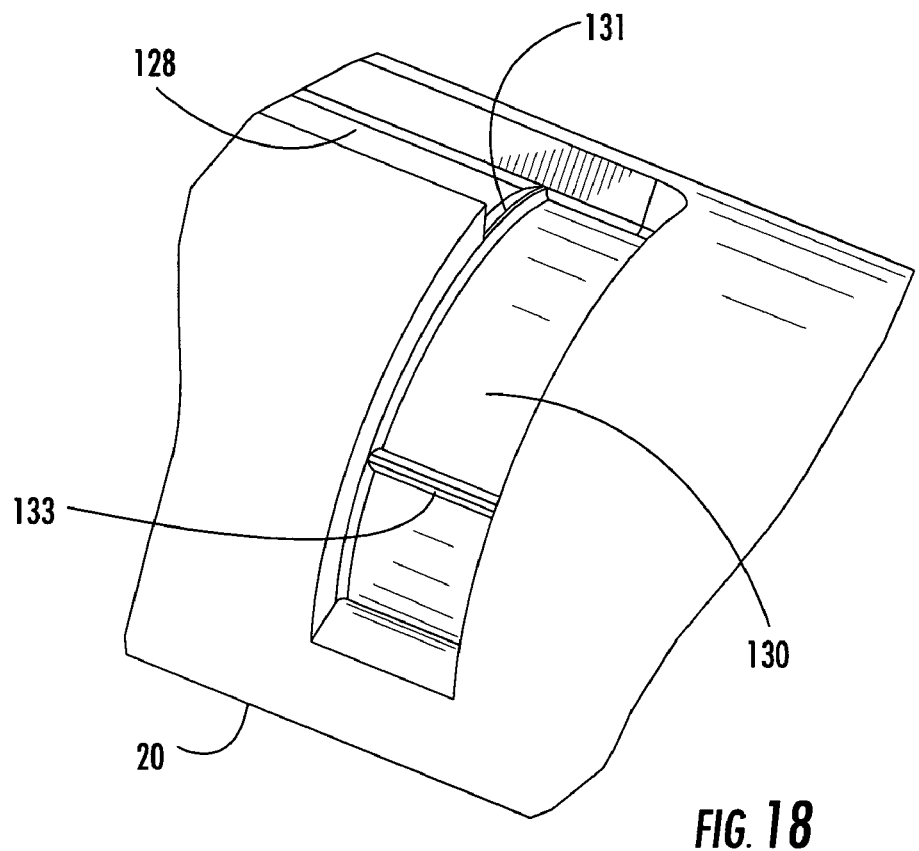
FIG. 18 is a detailed view of the L-shaped groove of the ferrule holder shown in FIG. 8 illustrating the ridges for retaining the inwardly extending projection of the cam member.

In the illustrated embodiment, the groove 126 defined by ferrule holder 20 is generally L-shaped. As such, groove 126 includes a first section 128 that extends lengthwise along a portion of ferrule holder 20 from the second end 58 of ferrule holder 20 to a medial portion of ferrule holder 20. In addition, groove 126 includes a second section 130 that extends circumferentially about a portion, such as one-quarter, of ferrule holder 20. As such, the inwardly extending projection 124 of cam member 30 is moved through the first section 128 of groove 126 as cam member 30 is slid lengthwise relative to ferrule holder 20 as cam member 30 is mounted upon ferrule holder 20. Thereafter, the inwardly extending projection 124 of cam member 30 is moved through the second section 130 of groove 126 as cam member 30 is rotated relative to ferrule holder 20. First and second sections 128, 130 of groove 126 of this embodiment are preferably orthogonal and intersect in the medial portion of ferrule holder 20 to permit cam member 30 to be rotated relative to ferrule holder 20 once cam member 30 has been fully mounted upon ferrule holder 20. As best illustrated by the detailed view in FIG. 18, second section 130 of groove 126 also includes ridge 131 extending across the width of second section 130 for retaining cam member 30 in place after cam 30 has been rotated relative to ferrule holder 20 to the second, actuated position. As inwardly extending projection 124 is moved along second section 130 of groove 126, inwardly extending projection 124 is "snapped" over ridge 131, thereby interferingly restraining cam member 30 from being inadvertently removed from ferrule holder 20.

As described supra, cam member 30 is in the first un-actuated position as cam member 30 is mounted upon ferrule holder 20 by moving the inwardly extending projection 124 through the first section 128 of groove 126. As also described supra, cam member 30 transitions from the first, un-actuated position to the second, actuated position as cam member 30 is rotated relative to ferrule holder 20 by moving the inwardly extending projection 124 through the second section 130 of groove 126. In the embodiment in which passageway 112 defined by cam member 30 includes a major axis 114 and a minor axis 116, cam member 30 and ferrule holder 20 are preferably designed such that exposed keel portion 104 of second splice member 28 is aligned with major axis 114 of passageway 112 of cam member 30 as inwardly extending projection 124 of cam member 30 is moved through first section 128 of groove 126. Correspondingly, cam member 30 and ferrule holder 20 of this advantageous embodiment are also preferably designed such that the exposed keel portion 104 of second splice member 28 is moved along the inside surface of cam member 30 from alignment with the major axis 114 of passageway 112 to alignment with the minor axis 116 of passageway 112 as the inwardly extending projection 124 is moved along through the second section 130 of groove 126. By engaging exposed keel portion 104 of second splice member 28 with the inside surface of cam member 30 along the minor axis 116 of passageway 112, splice components 26, 28 are actuated, such as by urging first and second splice members 26, 28 toward one another, so as to mechanically splice optical fiber stub 68 and field fiber 14 as described above.

By confining the inwardly extending projection 124 of cam member 30 to the generally L-shaped groove 126, the fiber optic connector 10 of this advantageous embodiment of the present invention insures that cam member 30 is fully mounted upon ferrule holder 20 prior to actuating splice members 26, 28 by rotating cam member 30 relative to ferrule holder 20, thereby providing complete or full actuation of splice members 26, 28. In addition, fiber optic connector 10 of this advantageous embodiment prevents cam member 30 from being removed from ferrule holder 20 without first being moved to an un-actuated position by rotating cam member 30 in the opposite direction relative to ferrule holder 20 so as to move the inwardly extending projection 124 from second section 130 of groove 126 in which splice members 26, 28 are actuated to first section 128 of groove 126 in which splice members 26, 28 are un-actuated. Ridge 131, in cooperation with inwardly extending projection 124, prevents inadvertent removal of cam member 30. Thus, fiber optic connector 10 of this advantageous embodiment prevents inadvertent damage to the components of the fiber optic connector which could otherwise possibly be incurred by removing cam member 30 from ferrule holder 20 while in the actuated position. Once splice members 26, 28 have been actuated, such as by mounting cam member 30 upon the ferrule holder 20 and thereafter rotating cam member 30 relative to ferrule holder 20 the remaining components of the fiber optical connector may be assembled.

Figure 14:
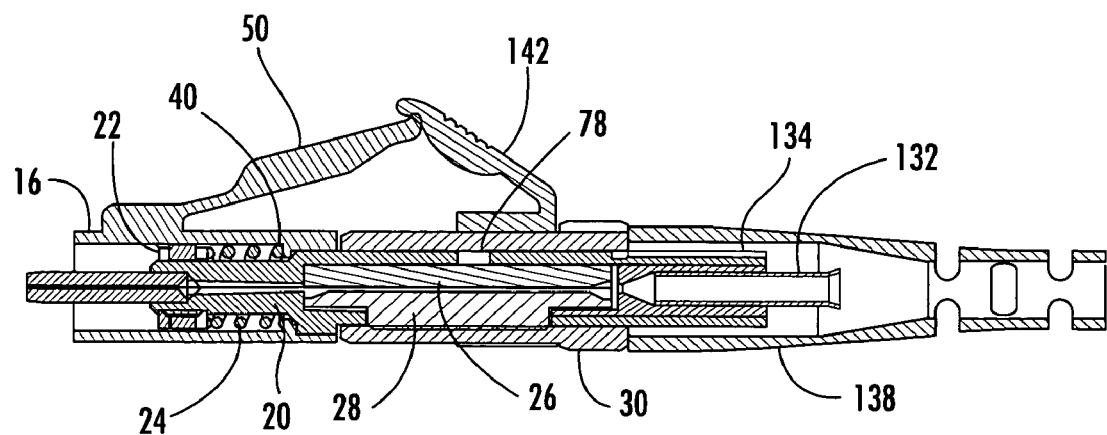
FIG. 14 is a longitudinal cross section of the fiber optic connector of FIG. 1 shown in the fully assembled configuration.

As shown in FIGS. 1 and 14, fiber optic connector 10 includes crimp tube 132 which is mounted within the rearward end of lead in tube 84. Crimp tube 132 may be formed from any material suitable for the purpose, including copper, stainless steel or brass. To insert field fiber 14 into crimp tube 132, a portion of coating which may surround field fiber 14 is removed to expose the bare glass of field fiber 14. Enough coating material is removed from field fiber 14 such that field fiber 14 may extend within connector 10 to abut with optical fiber stub 68 between splice members 26 and 28. When field fiber 14 has been inserted into crimp tube 132, the coated portion of field fiber 14 may be securely engaged by crimp tube 132 by crimping crimp tube 132 about the coated portion of field fiber 14.

Also as shown in FIGS. 1 and 14, fiber optic connector 10 may include annular crimp band 134 which is mounted upon the rearward end 58 of ferrule holder 20 proximate cam member 30. Crimp band 134 may be formed from any material suitable for the purpose, including copper, stainless steel or brass. In embodiments in which field fiber 14 is associated with strength members 136, such as the filamentary strength members of fiber optic cable 12 as shown in FIG. 1, strength members 136 can be positioned between crimp band 134 and ferrule holder 20 such that strength members 136 can be securely engaged by crimping crimp band 134 about ferrule holder 20 as known by those skilled in the art. The strength members of fiber optical cable 12 may comprise, for example, an aramid filament or yarn. Thereafter, boot 138 which has previously been mounted on field fiber 14 can be mounted over crimp band 134 so as to provide strain relief to field fiber 14.

Figure 21:
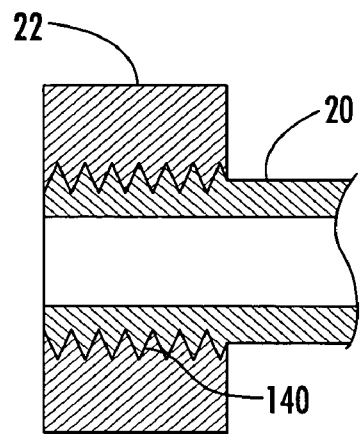
FIG. 21 is a partial longitudinal cross section of the first end of the ferrule holder showing an exemplary attachment of the spring element retainer with a screw thread.
Figure 22:
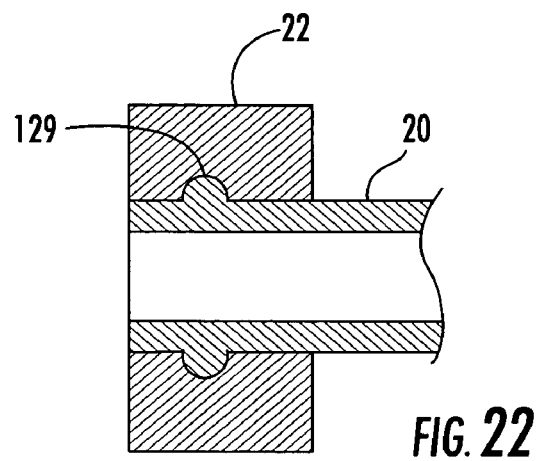
FIG. 22 is a partial longitudinal cross section of the first end of the ferrule holder showing an exemplary attachment of the spring element retainer with a ridge and groove.
Figure 23:
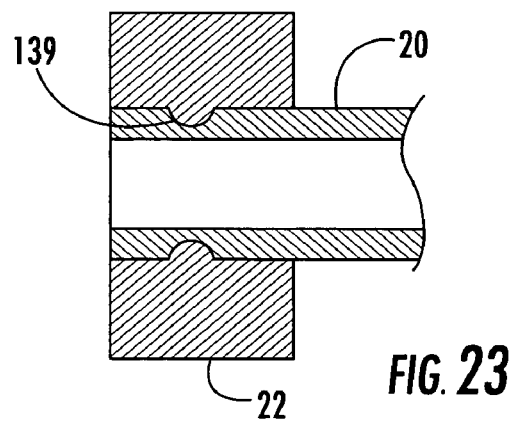
FIG. 23 is a partial longitudinal cross section of the first end of the ferrule holder showing an exemplary attachment of the spring element retainer with a ridge and groove in an alternative configuration.

As illustrated in FIG. 1 and 14, ferrule holder 20 is inserted into the rearward opening 38 of housing 16 such that first end 56 of ferrule holder 20, and ferrule 18, extend forward beyond spring element seat 40. Spring element 24 is positioned over first end 56 of ferrule holder 20 and compressed between the forward face 42 of spring element seat 40 and spring element retainer 22 to a predetermined spring force, spring element retainer 22 being engaged with first end 56 of ferrule holder 20. Thus, ferrule holder 20, and ferrule 18, are allowed to translate axially, or piston, within housing 16. Spring element retainer 22 may be engaged with first end 56 of ferrule holder 20 by any suitable method known in the art. As best shown in FIGS. 6 and 8, ferrule holder 20 is formed with screw threads 140 located proximate end 56. As best depicted in FIG. 21, corresponding screw threads on the inside surface of spring element retainer 22 are configured to engage with screw threads 140 on ferrule holder 20 and allow spring element retainer 22 to be removably fastened to end 56 of ferrule holder 20 by screwing spring element retainer 22 to end 56 of ferrule holder 20. Alternatively, end 56 and spring element retainer 22 may be designed to allow spring element retainer 22 to be snap fit to ferrule holder 20 at end 56. For example, as shown in FIGS. 22 and 23, a groove 139 (FIG. 23) may be formed about a circumference of ferrule holder 20 proximate end 56. A corresponding ridge 129 (FIG. 22) formed about the inside circumference of spring retainer 22 is configured to engage with groove 139. Spring element retainer 22 may then be snapped into place over end 56 of ferrule holder 20. Alternatively, a groove may be formed about the inside circumference of spring element retainer 22 and a corresponding ridge nay be formed about ferrule holder 20 proximate end 56.

Spring element 24 is configured such that spring element 24 is fully compressed before stop 72 of ferrule holder 20 is completely removed from housing 16, thus limiting the longitudinal movement of ferrule holder 20 within housing 16. When connector 10 has been assembled, spring element 24 preferably exerts a spring force between about 1 and 1.5 lbs against spring retainer 22, more preferably between about 1.1 and 1.4 lbs.

Figure 24:
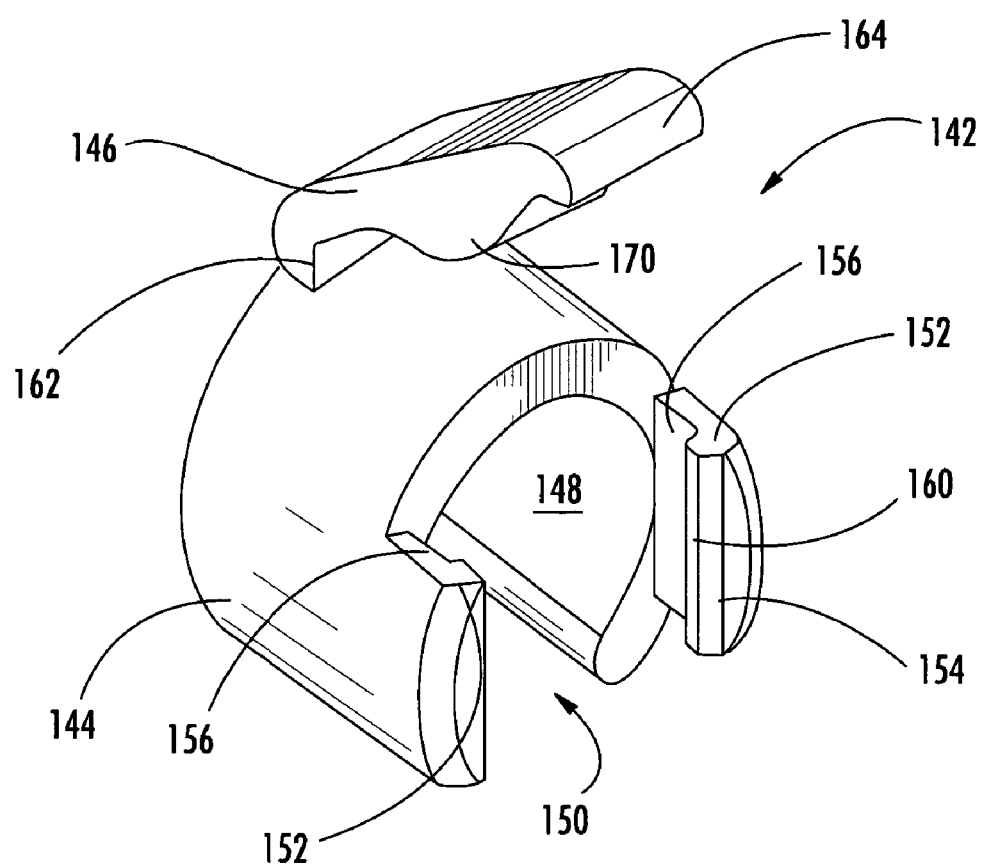
FIG. 24 is a perspective view of the trigger member of FIG. 1.

According to one embodiment of the invention, and as broadly shown in FIG. 24, a trigger member 142 is removably attached to cam member 30. Trigger member 142 includes a first element 144 and a second element 146. Trigger member 142 is removably attached to cam member 30 via first element 144. First element 144 preferably defines a longitudinally-extending opening 148 configured for receiving cam barrel 122 (FIG. 17) and permitting trigger member 142 to be snapped over cam member 30 to thereby attach trigger member 142 to cam member 30. More particularly, opening 148 is configured for permitting trigger member 142 to be radially snapped onto cam barrel 122. Accordingly, a slot 150 is provided in first element 144. Slot 150 should be wide enough to allow barrel 122 to pass though the slot. First member 144 may thus be substantially C-shaped to snugly fit on barrel 122 of cam member 30. Although not illustrated, if barrel 122 was a shape other than cylindrical (e.g., square, rectangular, etc., in cross-section), then trigger member 142 would have a corresponding configuration.

Mating attachment elements are provided respectively on cam member 30 and first element 144 for releasably attaching and axially securing first element 144 to the housing. Preferably, the mating attachment elements comprise snap members 152 on trigger member 142 and grooves 153 in cam member 30. The locations of snap members 152 and grooves 153 could be switched. Snap members 152 may include chamfered edges 154 to allow trigger member 142 to be more easily snapped over cam member 30. The mating attachment elements may alternately have other complimentary shapes, such as ridges, dimples, arcs, spherical sections, etc., within the scope of the invention spring retainer 22 is configured to engage with groove 139. Spring element retainer 22 may then be snapped into place over end 56 of ferrule holder 20. Alternatively, a groove may be formed about the inside circumference of spring element retainer 22 and a corresponding ridge nay be formed about ferrule holder 20 proximate end 56.

Spring element 24 is configured such that spring element 24 is fully compressed before stop 72 of ferrule holder 20 is completely removed from housing 16, thus limiting the longitudinal movement of ferrule holder 20 within housing 16. When connector 10 has been assembled, spring element 24 preferably exerts a spring force between about 1 and 1.5 lbs against spring retainer 22, more preferably between about 1.1 and 1.4 lbs.

According to one embodiment of the invention, and as broadly shown in FIG. 24, a trigger member 142 is removably attached to cam member 30. Trigger member 142 includes a first element 144 and a second element 146. Trigger member 142 is removably attached to cam member 30 via first element 144. First element 144 preferably defines a longitudinally-extending opening 148 configured for receiving cam barrel 122 (FIG. 17) and permitting trigger member 142 to be snapped over cam member 30 to thereby attach trigger member 142 to cam member 30. More particularly, opening 148 is configured for permitting trigger member 142 to be radially snapped onto cam barrel 122. Accordingly, a slot 150 is provided in first element 144. Slot 150 should be wide enough to allow barrel 122 to pass though the slot. First member 144 may thus be substantially C-shaped to snugly fit on barrel 122 of cam member 30.

Although not illustrated, if barrel 122 was a shape other than cylindrical (e.g., square, rectangular, etc., in cross-section), then trigger member 142 would have a corresponding configuration.

Mating attachment elements are provided respectively on cam member 30 and first element 144 for releasably attaching and axially securing first element 144 to the housing. Preferably, the mating attachment elements comprise snap members 152 on trigger member 142 and grooves 153 in cam member 30. The locations of snap members 152 and grooves 153 could be switched. Snap members 152 may include chamfered edges 154 to allow trigger member 142 to be more easily snapped over cam member 30. The mating attachment elements may alternately have other complimentary shapes, such as ridges, dimples, arcs, spherical sections, etc., within the scope of the invention.

Mating alignment elements are also provided for rotationally securing first element 144 relative to cam member 30. The alignment elements may comprise any variety of non-circumferential surfaces that interferingly prevent substantial rotation of trigger member 30 relative to cam member 30. The alignment elements may comprise for example, planar surfaces 156 and 158, as shown in FIGS. 17 and 24, that contact each other when trigger member 142 is attached to cam member 30. As shown, alignment elements 158 are on cam member 30 and alignment elements 156 are on first element 144 of trigger member 30. Alternately, the alignment elements may comprise planar surfaces 160 at the ends of snap members 152 and corresponding planar surfaces at the bottom of grooves 153. Also, the alignment elements could have shapes other than planar, such as oblong, oval, irregular, etc., and be within the scope of the invention. When the alignment elements are aligned, second member 146 is also aligned with latch 50 (unless trigger member 142 has been installed upside down). If desired, the attachment elements and alignment elements could be configured so that inadvertent misaligned attachment of trigger member 142 to cam member 30 is difficult or impossible, for example by making the attachment or alignment elements non-symmetrical or irregular in some way.

Second element 146 of trigger member 142 has a proximal end 162 attached to first element 144 and a distal end 164 extending from the first element. Second element 146 provides at least two functions. First, second element 146 is pivotable as is latch 50 and engages the latch to pivot the latch downward. The engagement moves distal end 166 (FIG. 3) of latch 50 downward to selectably release housing 16 from a receptacle. Second element 146 has a contoured surface 170 for contacting tip 172 (FIG. 3) of latch 50 and assisting in pivoting latch 50 downward when second element 146 is depressed. Second element 146 thus comprises a trigger element which releases latch 50 when the trigger element is depressed. The second function provided is that if cable 12 is pulled backwardly, second element 146 reduces the possibility of latch 50 snagging on other cables, corners, or other fixtures along the routing path, as the second element extends at an acute angle toward and beyond tip 172 of latch 50. Preferably first and second elements 144, 146 are comprised of a suitable plastic material and are molded in one piece therefrom.

When ferrule holder 20 has been assembled into housing 16 and cam member 30 has been fully mounted onto ferrule holder 20, trigger member 142 may preferably be mounted onto cam member 30 such that snap members 152 may engage with corresponding recesses, or grooves 153 on cam member 30. The engagement of snap members 152 with grooves 153 prevent trigger member 142 from rotating on cam member 30 and maintain second trigger member 144 in alignment with latching arm 50 when cam member 30 has been rotated into the second, actuated position.

Field assembly of the optical fiber connector according to the present invention comprises inserting a second optical fiber, such as field fiber 14 into the rearward opening of lead in tube 84 until field fiber 14 is abutted to optical fiber stub 68. Preferably, the end of field fiber 14 which is inserted into connector 10 is cleaved with a good end face, preferably with a cleave angle less than about 1 degree, to facilitate transmission therethrough. A light, such as a visible laser light or light from an LED, may be injected in the first end of optical fiber stub 68, whereupon cam member 30 is turned in a direction which urges splice members 26 and 28 together, thereby securing the abutting ends of optical fiber stub 68 and field fiber 14 in a position that facilitates transmission therethrough. For example, a tool (not shown) may be used to engage with a portion of cam member 30 adapted to engage with the tool, and cam member 30 then rotated to urge splice members 26 and 28 together. View port 78 may then be observed for an indication of the quality of the splice between the optical fiber stub 68 and field fiber 14, as described supra. When cam member 30 has been rotated and a good splice indicated by the absence of light from view port 78, trigger member 142 may then be snapped onto cam member 30 as previously described.

As described above, an optical fiber connector 10 of the present invention can be readily fabricated. In particular, the ferrule can be formed and the optical fiber stub 68 disposed therein in a factory setting such that the first end of the optical fiber stub 68 can be polished while disposed in the first end of ferrule 18. Thereafter, an end portion of a second optical fiber, such as field fiber 14, can be inserted through lead in tube 84 into cavity 70 between splice members 26, 28, whereupon cam member 30 may be rotated to activate splice members 26, 28. When activated, splice members 26 and 28 secure the second end 69 of optical fiber stub 68 and field fiber 14 to facilitate transmission therethrough. Once optical fiber stub 68 and field fiber 14 have been secured by splice members 26, 28, the various remaining components of connector 10, such as crimp band 134 and boot 138, may be assembled onto fiber optic connector 10.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber connector comprising;
   a housing having an inner surface defining a cavity extending longitudinally therethrough and a spring element seat disposed therein, the housing also defining a forward opening in communication with the cavity and a rearward opening in communication with the cavity;
   a spring element inserted into the cavity through the forward opening of the housing; and
   a ferrule holder inserted into the cavity through the rearward opening of the housing.

2. The optical fiber connector according to claim 1 further comprising a spring element retainer disposed about a forward end of the ferrule holder, wherein the spring element is disposed between the spring element seat and the spring element retainer and urges the ferrule holder forward with a predetermined spring force.

3. The optical fiber connector according to claim 2 wherein the predetermined spring force is greater than about 1 lb.

4. The optical fiber connector according to claim 3 wherein the predetermined spring force is between about 1.1 and 1.4 lbs.

5. The fiber optic connector according to claim 1 further comprising a ferrule disposed in the ferrule holder, and an optical fiber stub disposed within the ferrule.

6. An optical fiber connector comprising;
 a housing having an inner surface defining a cavity extending longitudinally therethrough and a spring element seat disposed therein, the housing also defining a forward opening in communication with the cavity and a rearward opening in communication with the cavity;
 a spring element inserted into the cavity through the forward opening of the housing;
 a ferrule holder inserted into the cavity through the rearward opening of the housing;
 a ferrule disposed within the ferrule holder and having an optical fiber stub disposed within the ferrule; and
 a view port for providing a visual indication of the quality of a splice between the optical fiber stub and a field fiber.

7. An optical fiber connector comprising;
 a housing having an inner surface defining a cavity extending longitudinally therethrough and a spring element seat disposed therein, the housing also defining a forward opening in communication with the cavity and a rearward opening in communication with the cavity;
 a spring element inserted into the cavity through the forward opening of the housing;
 a ferrule holder inserted into the cavity through the rearward opening of the housing; and
 a cam member disposed about the ferrule holder.

8. The optical fiber connector according to claim 7 further comprising a first and second splice member disposed within the ferrule holder.

9. An optical fiber connector comprising;
 a housing having an inner surface defining a cavity extending longitudinally and a spring element seat therein, the housing also defining a rearward opening in communication with the cavity and a forward opening in communication with the cavity;
 a ferrule having first and second ends and a passageway disposed axially therebetween;
 an optical fiber stub disposed within the ferrule passageway;
 a ferrule holder extending longitudinally between opposing first an second ends and defining a passageway extending longitudinally therebetween, the ferrule holder first end inserted through the housing rearward opening and extending beyond the spring element seat and configured to hold the ferrule, the ferrule holder being slidable longitudinally within the housing;
 a spring element retainer disposed at the first end of the ferrule holder;
 a first and second opposed splice member disposed within the ferrule holder, each splice member extending longitudinally from a first end proximate the second end of the ferrule to an opposite second end, one of the splice members including a longitudinal fiber aligning groove wherein the optical fiber stub extends between the opposed splice member in the groove and terminates at a position intermediate the first and second ends of the splice members;
 a cam member disposed about the ferrule holder, the cam member having a first end and a second end and a passageway extending longitudinally therebetween; and
 a spring element disposed between the spring element seat and the spring element retainer, wherein to spring element urges the ferrule holder forward with a predetermined spring force.

10. The optical fiber connector according to claim 9 wherein the first and second splice members are configured to allow a field fiber to be inserted axially between the second ends of the splice members toward the first ends thereof such that the field fiber is guided by the groove into abutment with an end of the optical fiber stub.

11. The optical fiber connector according to claim 10 wherein the cam member passageway comprises a major axis and a minor axis.

12. The optical fiber connector according to claim 11 wherein at least one of the first and second splice members comprises a keel portion, the cam member being movable between an initial position wherein the keel portion is aligned with the major axis allowing the splice members to move apart to facilitate insertion of the field fiber therebetween, and a final position wherein the keel portion is aligned with the minor axis in which the cam member urges the splice members in the vicinity of to intermediate position thereof relatively toward each other to clamp the field fiber and the optical fiber stub therebetween.

13. The optical fiber connector according to claim 9 wherein the ferrule holder surface further defines a key extending into the cavity.

14. The optical fiber connector according to claim 13 wherein the ferrule holder comprises a groove for slidably engaging with the housing key.

15. The optical fiber connector according to claim 9 wherein the ferrule holder comprises a port for providing a visual indication of the quality of a splice between the optical fiber stub and a field fiber.

16. The optical fiber connector according to claim 9 wherein the spring element, the spring element retainer, the housing and the ferrule holder are structured and arranged such that the spring element and the spring element retainer are inserted into the forward opening of the housing in the rearward longitudinal direction until cooperative retaining elements formed on the spring retainer and ferrule holder engage each other to fix the spring element retainer onto the ferrule holder.

17. The optical fiber connector according to claim 16 wherein the cooperative retaining elements comprise a screw thread.

18. The optical fiber connector according to claim 16 wherein the cooperative retaining elements comprise a ridge.

19. The optical fiber connector according to claim 9 wherein the housing comprises a latching arm extending from the housing.

20. The optical fiber according to claim 12 wherein the movement of the cam member from the first position to the second position comprises rotation of the cam member on the ferrule holder.

21. The optical fiber connector according to claim 19 further comprising a trigger element configured to cooperate with the latching arm.

22. The optical fiber connector according to claim 9 wherein the ferrule holder comprises a stop disposed at an intermediate position between the ferrule holder first and second ends and configured to cooperate with the housing rearward opening.

23. An optical fiber connector comprising:
a port for providing a visual indication of the quality of a splice between a first and second optical fiber within the connector.

24. A method of determining the quality of a splice between first and second optical fibers within an optical fiber connector comprising:
providing the optical fiber connector with a housing having an inner surface defining a cavity extending on longitudinally therethrough, a ferrule holder disposed at least partially within the cavity, a ferrule disposed at least partially within the ferrule holder within the first optical fiber disposed at least partially within the ferrule, and a cam member disposed about the ferrule holder;
passing a visible light through at least one of the optical fibers; and
viewing a view port on the connector for a visual indication of the quality of a splice between the first and second optical fibers.

25. The method according to claim 24 wherein the visible light comprises light from one of a laser or an LED.

26. The method according to claim 24 wherein the visual indication comprises a presence or absence of light from the view port.

27. The method according to claim 24 wherein at least one of the optical fibers is an optical fiber stub.

28. The method according to claim 24 further comprising abutting the first and second optical fiber within the fiber connector.

* * * * *